US009251803B2

(12) United States Patent
Wang

(10) Patent No.: US 9,251,803 B2
(45) Date of Patent: Feb. 2, 2016

(54) VOICE FILTERING METHOD, APPARATUS AND ELECTRONIC EQUIPMENT

(71) Applicant: Sony Corporation, Tokyo (JP)

(72) Inventor: Mengchuan Wang, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/262,904

(22) Filed: Apr. 28, 2014

(65) Prior Publication Data

US 2015/0073787 A1 Mar. 12, 2015

(30) Foreign Application Priority Data

Sep. 12, 2013 (CN) .......................... 2013 1 0414740

(51) Int. Cl.
*G10L 15/20* (2006.01)
*G10L 21/06* (2013.01)
*G10L 21/02* (2013.01)

(52) U.S. Cl.
CPC .................................. *G10L 21/0205* (2013.01)

(58) Field of Classification Search
None
See application file for complete search history.

(56) References Cited

U.S. PATENT DOCUMENTS

| | | | | |
|---|---|---|---|---|
| 7,152,032 | B2 * | 12/2006 | Suzuki et al. | 704/262 |
| 8,078,455 | B2 * | 12/2011 | Shi et al. | 704/208 |
| 8,892,232 | B2 * | 11/2014 | Suhami | H04R 25/00 379/390.02 |
| 2007/0198255 | A1 | 8/2007 | Fingscheidt et al. | |
| 2009/0287489 | A1 | 11/2009 | Savant | |
| 2012/0226495 | A1 | 9/2012 | Wu et al. | |

FOREIGN PATENT DOCUMENTS

EP 2528356 A1 11/2012

OTHER PUBLICATIONS

Extended European Search Report, corresponding to EP14184454.8, search dated Jan. 26, 2015.

* cited by examiner

*Primary Examiner* — Satwant Singh
(74) *Attorney, Agent, or Firm* — Renner, Otto, Boisselle & Sklar, LLP.

(57) ABSTRACT

Embodiments of the present invention provide a voice filtering method and apparatus and electronic equipment. The voice filtering method includes: determining a reference spectral characteristic to which a voice characteristic of a subscriber to be analyzed corresponds; and filtering an input sound signal according to the reference spectral characteristic. With the embodiments of the present invention, transmission effects of voices for different subscribers to be analyzed can be enhanced by using voice characteristics of the subscribers to be analyzed, so as to more efficiently transmit voice information.

13 Claims, 7 Drawing Sheets

L

VOICE FILTERING METHOD, APPARATUS AND ELECTRONIC EQUIPMENT

CROSS-REFERENCE TO RELATED APPLICATION

This application claims the benefit of CN Patent Application Serial No. 201310414740.5, filed Sep. 12, 2013, the entire disclosure of which is hereby incorporated by reference.

TECHNICAL FIELD

The present disclosure relates to a voice processing technology, and in particular to a voice filtering method, an apparatus for the same and electronic equipment.

BACKGROUND

Such electronic apparatuses as a communication apparatus and an electronic voice recording pen have been widely used till now. Such the electronic apparatuses collect voice signals of users via microphones, convert the voice signals into digital signals for transmission and/or recording, and then play them. In collecting voice signals of the users, ambient noises may be mixed into the microphones, thereby preventing the voices from being heard.

In the relevant art, multiple filtering technologies have being developed, which may improve the quality of the collected voice signals by lowing the levels of the noise signals and keeping or improving the levels of the voice signals.

SUMMARY

In such the filtering technologies, how to efficiently identify a noise signal and a voice signal becomes a key problem.

It should be noted that the above description of the background is merely provided for full and complete explanation of the present invention and for easy understanding by those skilled in the art. And it should not be understood that the above technical solution is known to those skilled in the art as it is described in the background art of the present invention.

In implementing the relevant art, the inventor of the present invention found that in the existing voice filtering technology, identical filtering parameters are used to suppress a noise of an input sound signal for different subscribers (users) to be analyzed. Such a noise suppression process with fixed filtering parameters is limited to the model of "voice vs. noise", in which no individual voice characteristic of users is taken into consideration, and it is a basic noise suppression solution.

Embodiments of the present invention provide a voice filtering method, an apparatus for the same and electronic equipment, with an object being to enhance transmission effects of individual voices for different subscribers to be analyzed by using specific voice characteristics of the subscribers to be analyzed, so as to more efficiently transmit individual information.

According to an aspect of the embodiments of the present invention, there is provided a voice filtering method, including:

determining a reference spectral characteristic to which a voice characteristic of a subscriber to be analyzed corresponds; and filtering an input sound signal according to the reference spectral characteristic.

According to another aspect of the embodiments of the present invention, the determining a reference spectral characteristic to which a voice characteristic of a subscriber to be analyzed corresponds includes:

acquiring a voice signal of the subscriber to be analyzed;

spectrally analyzing the voice signal of the subscriber to be analyzed, so as to obtain a reference spectrum of the voice signal of the subscriber to be analyzed; and extracting the reference spectral characteristic from the reference spectrum.

According to still another aspect of the embodiments of the present invention, the reference spectral characteristic includes the number of order(s) of a primary harmonic in the reference spectrum relative to a base frequency, and the intensity of the primary harmonic.

According to further still another aspect of the embodiments of the present invention, the filtering an input sound signal according to the reference spectral characteristic includes:

analyzing the input sound signal, so as to determine an input spectral characteristic corresponding to the input sound signal;

comparing the input spectral characteristic with the reference spectral characteristic;

selecting a gain corresponding to a result of the comparison; and processing the input sound signal according to the gain.

According to further still another aspect of the embodiments of the present invention, the selecting a gain corresponding to a result of the comparison includes:

selecting a voice gain if the input spectral characteristic is identical (or almost identical—as used herein "identical" includes "nearly identical" unless otherwise specified) to the reference spectral characteristic; and selecting a noise gain if the input spectral characteristic is different from the reference spectral characteristic.

According to further still another aspect of the embodiments of the present invention, the processing the input voice signals according to the gain includes:

delaying the input sound signal; and adjusting the intensity of the delayed input sound signal by using the gain.

According to further still another aspect of the embodiments of the present invention, there is provided a voice filtering apparatus, including:

a first determining unit configured to determine a reference spectral characteristic to which a voice characteristic of a subscriber to be analyzed corresponds; and a filtering unit configured to filter an input sound signal according to the reference spectral characteristic.

According to further still another aspect of the embodiments of the present invention, the first determining unit includes:

a first voice acquiring unit configured to acquire a voice signal of the subscriber to be analyzed;

a first voice analyzing unit configured to spectrally analyze the voice signal of the subscriber to be analyzed, so as to obtain a reference spectrum of the voice signal of the subscriber to be analyzed; and a first extracting unit configured to extract the reference spectral characteristic from the reference spectrum.

According to further still another aspect of the embodiments of the present invention, the filtering unit includes:

an input spectrum determining unit configured to analyze the input sound signal, so as to determine an input spectral characteristic corresponding to the input sound signal;

a comparing unit configured to compare the input spectral characteristic with the reference spectral characteristic;

a selecting unit configured to select a gain corresponding to a result of the comparison; and a processing unit configured to process the input sound signal according to the gain.

According to further still another aspect of the embodiments of the present invention, a voice gain is selected by the selecting unit if the input spectral characteristic is identical to the reference spectral characteristic; and a noise gain is selected by the selecting unit if the input spectral characteristic is different from the reference spectral characteristic.

According to further still another aspect of the embodiments of the present invention, the processing unit includes:

a delaying unit configured to delay the input sound signal; and an adjusting unit configured to adjust the intensity of the delayed input sound signal by using the gain.

According to further still another aspect of the embodiments of the present invention, there is provided electronic equipment, including the voice filtering apparatus as described above.

Advantages of the present invention exist in that transmission effects of individual voices for different subscribers to be analyzed are enhanced by using voice characteristics of the subscribers to be analyzed, thereby more efficiently transmitting voice information.

With reference to the following description and drawings, the particular embodiments of the present invention are disclosed in detail, and the principles of the present invention and the manners of use are indicated. It should be understood that the scope of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term “comprises/comprising” when used in this specification is taken to specify the presence of stated features, integers, steps or components but does not preclude the presence or addition of one or more other features, integers, steps, components or groups thereof.

Many aspects of the present invention can be better understood with reference to the drawings. The components in the drawings are not necessarily to scale, emphasis instead being placed upon clearly illustrating the principles of the present invention. To facilitate illustrating and describing some parts of the invention, corresponding portions of the drawings may be enlarged or reduced. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION

The embodiments of the present invention shall be described below with reference to the drawings. These embodiments are illustrative only, and are not intended to limit the present invention.

Figure 1:
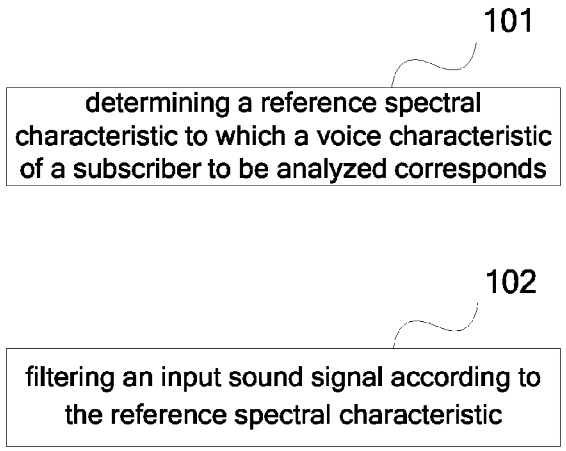
FIG. 1 is a flowchart of the voice filtering method of Embodiment 1 of the present invention.

Embodiment 1 of the present invention provides a voice filtering method. As shown in FIG. 1, the method includes:

step 101: determining a reference spectral characteristic to which a voice characteristic of a subscriber to be analyzed corresponds; and step 102: filtering an input sound signal according to the reference spectral characteristic.

There are so many parameters describing a sound, such as the tune of the sound, the loudness of the sound, and the tone of the sound; these parameters reflect the characteristics of the sound from different aspects. In these parameters, the tone most reflects a difference between sound generators, that is, sounds from different objects or generators may be differentiated even though with the same tune and the same loudness. The tone of a voice of a person is different from that of an ambient noise, and tones of voices of different persons are different.

The word “tone” means, for example, tone color, tone quality or timbre, which is the quality of a sound or tone that distinguishes different types of sound production. See for example, http://en.wikipedia.org/wiki/Timbre. The term “tune” means, for example, the frequency of sound or pitch. See, for example, http://en.wikipedia.org/wiki/Pitch_(music).

Figure 2:
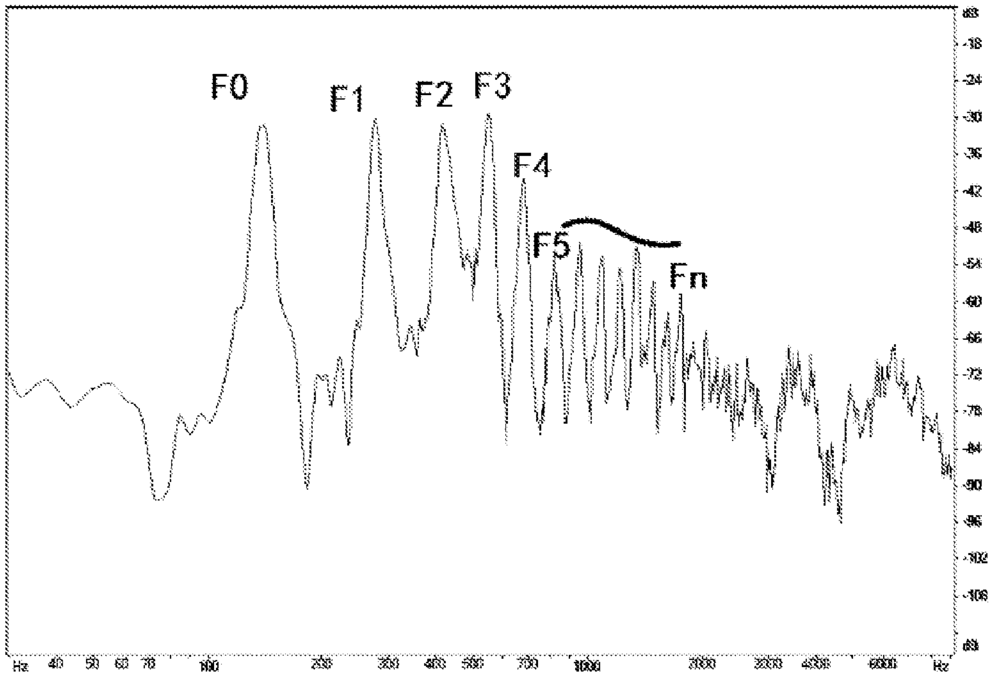
FIG. 2 is diagram of spectral analysis of a voice signal.

FIG. 2 is a diagram of spectral analysis of a voice signal. As shown in FIG. 2, the horizontal coordinate denotes a frequency (in Hertz), and the vertical coordinate denotes intensity (on a dB scale); wherein, F0 is the base frequency of a voice signal, and F1, F2, F3, . . . Fn are n-th order harmonic frequencies (i.e. harmonics), n being an order of a harmonic, that is, there are n orders of harmonics. In FIG. 2, the matching relationship between a frequency and intensity of a peak to which each order of harmonic corresponds is related to the physical structure of a voice generator (such as the vocal cords, oral cavity and throat features of a person). Hence, individually physical difference between voice generators is the basic reason for the difference between tones of each person.

Still referring to FIG. 2, for convenient example, as is mentioned above, F0 is the base frequency of a voice signal, and F1, F2, F3, . . . Fn are $1^{st}$, $2^{nd}$, $3^{rd}$, . . . n-th order primary harmonic frequencies, respectively; n being the number of orders of a primary harmonic. That is, there are n orders in the primary harmonic. For example, if n=5, there are 5 orders in the primary harmonic; that is, the number orders of the primary harmonic is 5, and the frequency of each order is F1, F2, F3, F4 and F5. As another example, if n=1, there is only one order in the harmonic; that is, the number of order of the primary harmonic is 1, and the frequency of the order is F1. Primary harmonic also is described further below.

Viewing from spectral analysis, the difference between different individual tones is mainly embodied by the difference of the distribution of harmonic energies of voices.

Figure 3A:
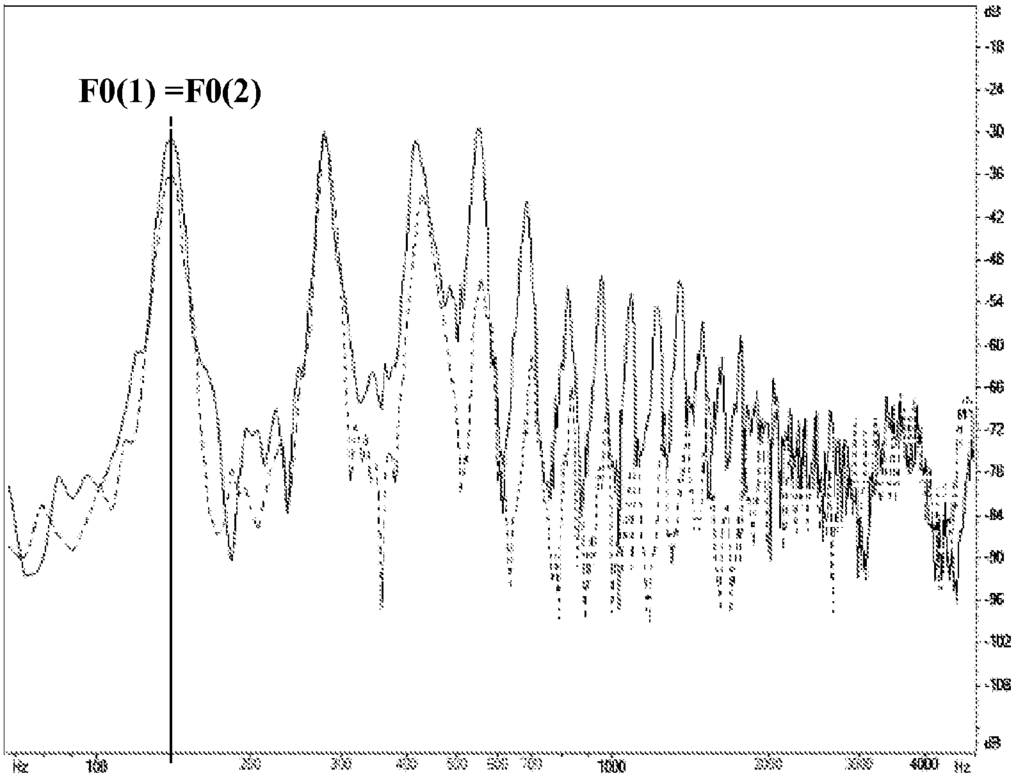
FIGS. 3A and 3B are diagrams of spectral analysis of different individual voice signals.
Figure 3B:
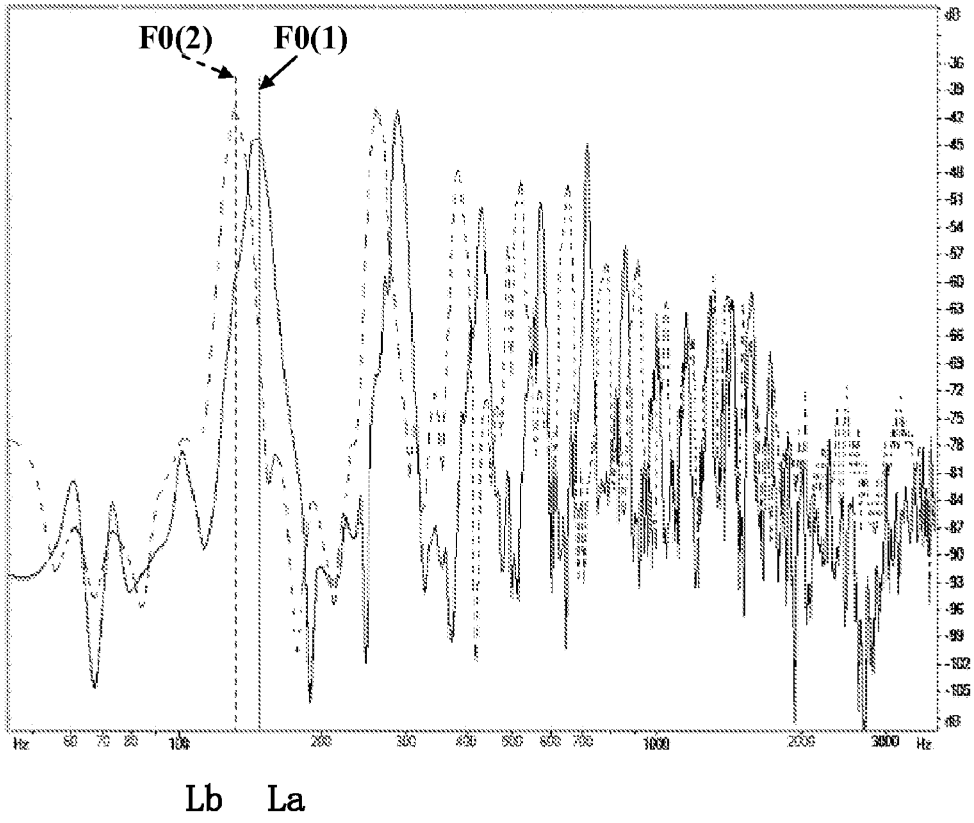

FIGS. 3A and 3B are diagrams of spectral analysis of different individual voices. In FIGS. 3A and 3B, the solid curves and the dotted curves denote spectral distribution of different individual voices.

FIG. 3A is a diagram of spectral distribution of different individual voices having identical base frequencies. In FIG. 3A and FIG. 3B, F0(1) and F0(2) denote base frequencies for the solid curve, respectively. In FIG. 3A F0(1)=F0(2), as is represented by the solid vertical line L, that is they are identical or almost identical, as is mentioned above, and, therefore, illustrate "spectral distribution of different individual voices having almost identical base frequencies." In FIG. 3B, F0(1) corresponds to the solid line and F0(2) corresponds to the dotted line; and these illustrate that the base frequency of F0(1) is different from the base frequency F0(2), as is represented by the vertical solid line La and vertical dotted line Lb, respectively.

It can be seen from FIG. 3A that the component compositions of two individual voice signals (such as the number of order (or orders) of harmonics, and frequencies and intensities of the respective harmonics) are different, even though the base frequencies of them are identical. FIG. 3B is a diagram of spectral distribution of different individual voices having different base frequencies.

As shown in FIG. 3B in expressing the same word or phrase, not only the base frequencies of different individual voices are different, but also the number of orders of the primary harmonics and the frequencies and intensity (reflecting energies of the harmonics) of the primary harmonics are different, thereby determining the difference between tones of different individual voices. A particular individual voice can be identified by identifying such parameters of the particular individual voice as the number of orders of the primary harmonic, and the intensity of the primary harmonic, etc.

In FIG. 3B a primary harmonic has more than one order, so reference can be made herein to "the number of orders of the primary harmonic." However, in some cases a primary harmonic may have only one order, and, therefore, reference may be made to "the number of order of the primary harmonic." In the description herein, reference may be made to the number of order of the primary harmonic, which is intended to cover both cases of there being only one order of the primary harmonic or several orders of the primary harmonic. In some cases reference may be made herein to "order(s) of the primary harmonic" and this also is intended to include both possibilities of there being only one order of the primary harmonic or several orders of the primary harmonic, to cover both cases. The foregoing convention is used both in the specification and claims unless otherwise identified otherwise.

Embodiment 1 of the present invention is made based on the principle that the particular individual voice can be accurately identified as it has a particular tone. It should be noted that the above illustrative description is given taking that a tone is a characteristic of a voice as an example; however, the present invention is not limited thereto. For example, other characteristics of the voice may also be applicable to the method or apparatus of the present invention if they can reflect the difference between individual voices.

In step 101 of this embodiment, a characteristic of tone is extracted; that is, a reference spectral characteristic corresponding to a characteristic of a voice of a subscriber to be analyzed is acquired; wherein, the reference spectral characteristic may be used to characterize the characteristic of the voice of the subscriber. It can be seen from the above description that the reference spectral characteristic may be a parameter most capable of embodying the tone of the subscriber when the tone is taken as the characteristic of the voice of the subscriber to be analyzed. For example, it may be a harmonic component composition of the voice. In a particular mode of implementation, the harmonic component composition of the voice may be the number of order of primary harmonic relative to the base frequency in the voice, and intensity of the primary harmonic, etc. In a particular embodiment, the intensity of each of the primary harmonics may be expressed as a proportion of sound pressure of each of the primary harmonics to that of the base frequency.

It should be noted that the primary harmonic may be determined in a lot of ways. In this embodiment, the primary harmonic may be determined according to a half peak width of a peak in the spectral analysis diagram. For example, the peak of the half peak width greater than or equal to a specific threshold value may be determined as the peak to which the primary harmonic corresponds, and if the half peak width is less than the threshold value, the peak may be deemed as not a peak to which the primary harmonic corresponds. In a particular implementation, the threshold value of the half peak width may be set as required by the subscriber and a product.

In other embodiments, the reference spectral characteristic may also include other parameters if other voice characteristic than tone is used.

Furthermore, in step 101 of this embodiment, the voice signal of the subscriber to be analyzed may be analyzed in a real-time manner, so as to determine the reference spectral characteristic corresponding to the voice signal of the subscriber to be analyzed; or a corresponding relationship list of the subscriber to be analyzed and the reference spectral characteristic may be prestored, so as to determine the reference spectral characteristic corresponding to the voice signal of the subscriber to be analyzed by looking up the list. Details shall be described further in the following modes of implementation.

In step 102 of this embodiment, characteristic signal filtering is performed; that is, whether an input sound signal is an expected voice signal or a noise signal is identified according to the reference spectral characteristic, and the expected voice signal or noise signal is processed in different ways according to the result of identification. For example, if the result of identification is the expected voice signal, the signal may be increased with respect to its intensity; and if the result of identification is the noise signal, the signal may be decreased with respect to its intensity, and so on. In this way, the input sound signal may be filtered in a real-time manner.

Figure 4:
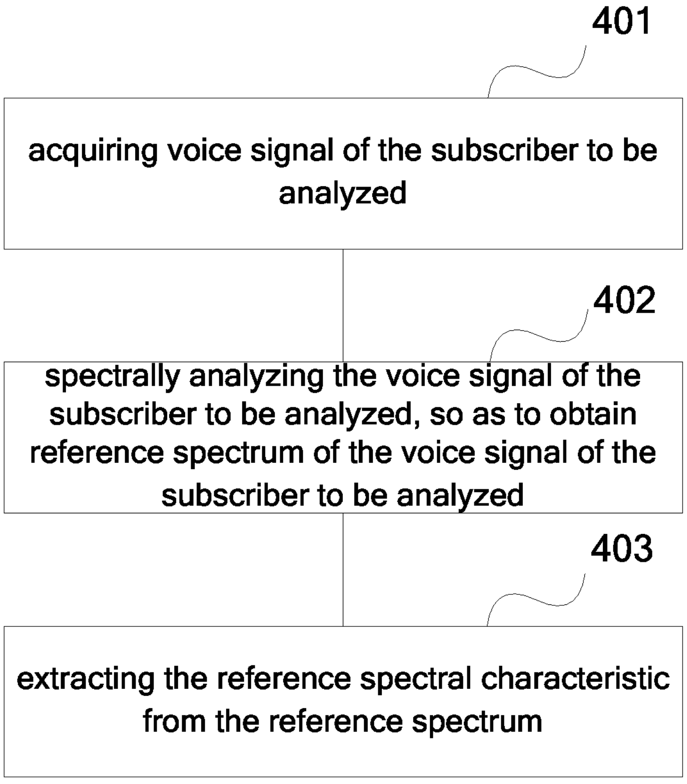
FIG. 4 is a flowchart of a method for determining a reference spectral characteristic of Embodiment 1 of the present invention.

FIG. 4 is a flowchart of a method for determining the reference spectral characteristic of a mode of implementation of step 101 of Embodiment 1 of the present invention. As shown in FIG. 4, the method for determining a reference spectral characteristic includes:

step 401: acquiring voice signal of the subscriber to be analyzed;

step 402: spectrally analyzing the voice signal of the subscriber to be analyzed, so as to obtain reference spectrum of the voice signal of the subscriber to be analyzed; and step 403: extracting the reference spectral characteristic from the reference spectrum.

In the embodiment of the present invention, a "training mode" may be started according to an indication signal from a user interface, and the reference spectral characteristic may be acquired through steps 401-403.

In step 401 of this embodiment, the voice signal of the subscriber to be analyzed may be acquired in various ways of the relevant art. For example, the voice signal of the subscriber to be analyzed may be directly collected by such voice collecting device as a microphone, etc., and a time length for collection according to an indication signal from a user interface can be used for controlling the start and end of the collection process. Furthermore, the voice signal of the subscriber to be analyzed may be acquired from a storage device. It should be note that the voice signal should contain ambient noises as little as possible, thereby to provide for more accurately analyzing the voice characteristic of the subscriber to be analyzed.

In step 402 of this embodiment, the acquired voice signal of the subscriber to be analyzed are spectrally analyzed, so as to obtain reference spectrum of the voice signal of the subscriber to be analyzed.

In a particular mode of implementation, fast Fourier transform (FFT) may be performed to the voice signal of the subscriber to be analyzed, so as to transform the voice signal in the time domain into the frequency domain and obtain spectra, i.e. a reference spectrum, of the voice signal. The relevant art may be referred to for the detailed mode of implementation of the FFT, which shall not be described in this embodiment any further.

In step 403 of this embodiment, the reference spectral characteristic is extracted from the reference spectrum. As the reference spectrum reflects intensity distribution of signals in different frequencies in the voice signal of the subscriber to be analyzed, some of the characteristics may be extracted from the reference spectrum to reflect the voice characteristic of the subscriber to be analyzed.

In a particular implementation, the extracted reference spectrum characteristic may be the number of order of the primary harmonic relative to the base frequency and the intensity of the primary harmonic; wherein, the primary harmonics may be located within the audible domain, and may be determined with reference to a hearing masking curve of a human ear. Furthermore, the primary harmonics may be more than one harmonic. In a particular mode of implementation, the intensity of the primary harmonics may be expressed as a sound pressure proportion of the primary harmonic to the base frequency. The said extracted reference spectrum characteristic may be stored in a form of a list, thereby facilitating the subsequence filtering operation.

It should be noted that steps 401-403 may be executed for a voice signal, so as to determine a list of reference spectral characteristics; and multiple voice signals of the subscriber to be analyzed may also be acquired, and steps 401-403 may be executed for these voice signals, so as to obtain a list of multiple reference spectrum characteristics. Furthermore, the list of multiple reference spectrum characteristics is statistically processed to obtain a list of averaged reference spectral characteristics, whereby reference spectral characteristics obtained through a relatively large amount of statistics being able to more accurately reflect the voice characteristic of the subscriber to be analyzed. For example, in the list, a subscriber corresponds to an "averaged reference spectral characteristic", so there are plural "averaged reference spectral characteristics" for plural subscribers. Each "averaged reference spectral characteristic" can be obtained by statistically processing multiple "reference spectral characteristics", which may be acquired by analyzing multiple voice signals of the subscriber.

In another mode of implementation of determining the reference spectral characteristic in step 101, reference spectral characteristics to which multiple subscribers to be analyzed correspond may be prestored. In this way, a reference spectral characteristic to which a subscriber to be analyzed corresponds may be directly acquired by selecting the subscriber to be analyzed, without needing to analyze the voice signal of the subscriber in a real-time manner.

The above two modes of implementation are examples of determining a reference spectral characteristic only. However, the embodiment of the present invention is not limited thereto, and any solution for determining a reference spectral characteristic corresponding to a subscriber to be analyzed is covered by the scope of the embodiments of the present invention. After obtaining the reference spectral characteristic corresponding to the voice characteristic of the subscriber to be analyzed, in step 102, the input voice signals may be filtered according to the reference spectral characteristic.

Figure 5:
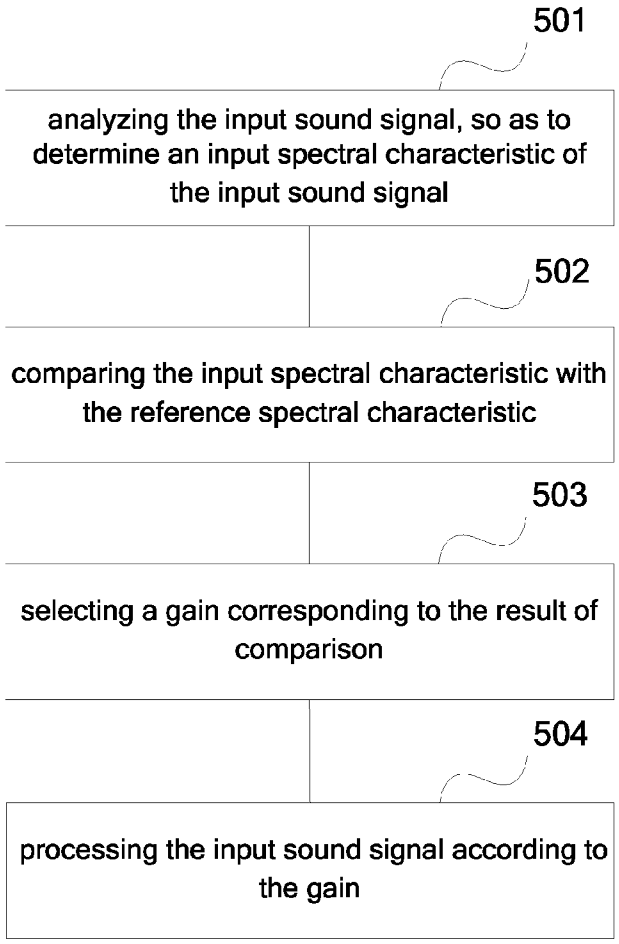
FIG. 5 is a flowchart of a method for filtering input sound signal of an embodiment of the present invention.

FIG. 5 is a flowchart of a method for filtering an input sound signal in step 102 of an embodiment of the present invention. As shown in FIG. 2, the method for filtering input sound signal includes:

step 501: analyzing the input sound signal, so as to determine an input spectral characteristic of the input sound signal;

step 502: comparing the input spectral characteristic with the reference spectral characteristic;

step 503: selecting a gain corresponding to the result of comparison; and step 504: processing the input sound signal according to the gain.

In an embodiment of the present invention, the input sound signal not only contains voice signal of the subscriber to be analyzed, but also is intermingled with ambient noise signal. The intensity of the voice signal may be increased and/or the noise signal may be decreased by filtering the input sound signal, thereby improving the signal-to-noise ratio.

In an embodiment of the present invention, an "enabling mode" may be started according to an indication signal from the user interface. In the "enabling mode", the input voice signals may be filtered in above steps 501-504.

In step 501, input spectral characteristics corresponding to the input sound signal may be determined in various ways. For example, a method similar to steps 402-403 may be employed; that is, the input sound signal may be spectrally analyzed by using FFT, so as to obtain spectrum, i.e. input spectrum, of the input sound signal; and then input spectral characteristic is extracted from the input spectrum, the input spectral characteristic being the number of order of a primary harmonic and the intensity of the primary harmonic; furthermore, the input spectral characteristics may be set in the form of a list. For example, in step 501, the input sound signal may be analyzed by using FFT to obtain spectrum, i.e., "input spectrum", and then the spectral characteristic, i.e., "input spectral characteristic" may be extracted from the "input spectrum"; and the "input spectral characteristic" may be the number of order of a primary harmonic and the intensity of the primary harmonic.

It should be noted that the needed input spectral characteristics may not always be extracted from the input spectrum. For example, the primary harmonic cannot be identified from the input spectrum if the noise signal in the input sound signal drowns the voice signal of the user, hence, such parameters as the number of order of the primary harmonic and the sound pressure proportion of the primary harmonic to the base frequency cannot be extracted. In such a case, a specific value may be assigned to the number of order of the primary harmonic and the sound pressure proportion of the primary harmonic to the base frequency in the list, denoting that these parameters cannot be extracted. Under such circumstances, special gain processing may not be performed to the sound signal, and the input sound signal would be transmitted to a subsequent system at a relatively low magnitude.

In an embodiment of the present invention, as the input spectral characteristic and the reference spectral characteristic are characterized by using an identical parameter, the voice signal of the subscriber to be analyzed contained in the input sound signal may be identified by comparing the identical parameter.

In step 502 of this embodiment, the input spectral characteristic and the reference spectral characteristic are compared.

In particular implementation, an example of determining whether the input spectral characteristic and the reference spectral characteristic are the same or different may include, the number of order of the primary harmonic in the input spectrum and the reference spectrum may be compared, so as to obtain a first comparison value; the intensity of the primary harmonic in the input spectrum and the reference spectrum may be compared, so as to obtain a second comparison value; and if the first comparison value is in a first predefined range and/or the second comparison value is in a second predefined range, it may be determined that the input spectral characteristic and the reference spectral characteristic are identical; otherwise, it may be determined that the input spectral characteristic and the reference spectral characteristic are different.

In this embodiment, as the input spectral characteristic reflects the tone of the input sound signal, and the reference spectral characteristic reflects the tone of the voices of the subscriber to be analyzed, when the input spectral characteristic and the reference spectral characteristic are identical, it may be deemed that the tone of the input sound signal and the tone of the voice of the subscriber to be analyzed are identical, that is, the input voice signal may be deemed as voice signal emitted by the subscriber to be analyzed; otherwise, when the input spectral characteristic and the reference spectral characteristic are different, it may be deemed that the input sound signal are not voice signal from the subscriber to be analyzed, hence, the input sound signal may be deemed as noise signal.

In step 503 of this embodiment, a gain corresponding to a result of comparison is selected according to the result of comparison of the input spectral characteristic and the reference spectral characteristic.

In this embodiment, if the result of comparison is that the input spectral characteristic and the reference spectral characteristic are identical, it may be deemed that the input voice signal is voice signal from the subscriber to be analyzed, and hence, a voice gain may be selected, which may be used to amplify the intensity of the input sound signal.

In particular implementation, a particular value of the voice gain may be set as required by the subscriber and a product; furthermore, a particular value of the voice gain may be dynamically adjusted according to the intensity of the input sound signal. For example, when the intensity of the input sound signal is relatively large, the voice gain may be appropriately decreased; and when the intensity of the input sound signal is relatively small, the voice gain may be appropriately increased. In this way, the intensity of the sound signal that are voice gain processed is stable, and the subscriber will not feel that the voice is sometimes high and sometimes low.

Furthermore, in this embodiment, if the result of comparison is that the input spectral characteristic and the reference spectral characteristic is different, it may be deemed that the input sound signal is noise signal, and hence, a noise gain may be selected, which may be used to decrease the intensity of the noise signal, thereby lowering the volume of the noise signal.

In particular implementation, a particular value of the noise gain may also be set as required by the subscriber and a product.

In step 504 of this embodiment, the input sound signal is correspondingly processed according to the selected voice gain or the noise gain.

In particular implementation, assuming the time needed in executing steps 501-503 is t, a corresponding gain may only be obtained by delaying by t for the sound signal input at a time T. Therefore, in this embodiment, the input sound signal may be delayed, so as to wait for the completion of the comparison step and the gain selection step, and then the intensity of the gain delayed sound signal is amplified or decreased.

In particular implementation, a delay time may also be set for delay processing the input sound signal as required by the subscriber and a product.

Adjusting the intensity of the delayed sound signal may be performed by adjusting the volume of the sound signal according to the gain, such as amplifying the volume of the voice signal according to the voice gain, or decreasing the volume of the noise signal according to the noise gain. It should be noted that the processing of the sound signal of the present invention is not limited to adjusting the volume, and the voice signal or the noise signal may be processed according to the gain.

It can be seen from the above embodiment that transmission effects of voices of different subscribers to be analyzed may be enhanced by using voice characteristics of the subscribers to be analyzed, so as to more efficiently transmit voice information.

Embodiment 2

Embodiment 2 of the present invention provides a voice filtering apparatus, corresponding to the voice filtering method as described in Embodiment 1, with the parts identical to those of Embodiment 1 being not going to be described any further.

Figure 6:
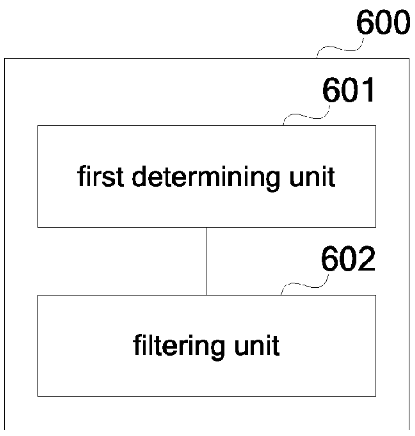
FIG. 6 is a schematic diagram of composition of the voice filtering apparatus of Embodiment 2 of the present invention.

FIG. 6 is a schematic diagram of composition of the voice filtering apparatus of Embodiment 2 of the present invention. As shown in FIG. 6, the voice filtering apparatus includes:

a first determining unit 601 configured to determine a reference spectral characteristic to which a voice characteristic of a subscriber to be analyzed corresponds; and a filtering unit 602 configured to filter an input sound signal according to the reference spectral characteristic.

Refer to particular operational modes of corresponding steps in Embodiment 1 for particular operational modes of the units in this embodiment, which shall not be described herein any further. It should be noted that those parts of the voice filtering apparatus 600 related to this embodiment are shown only, the rest parts are not shown, and the relevant art may be referred to.

Figure 7:
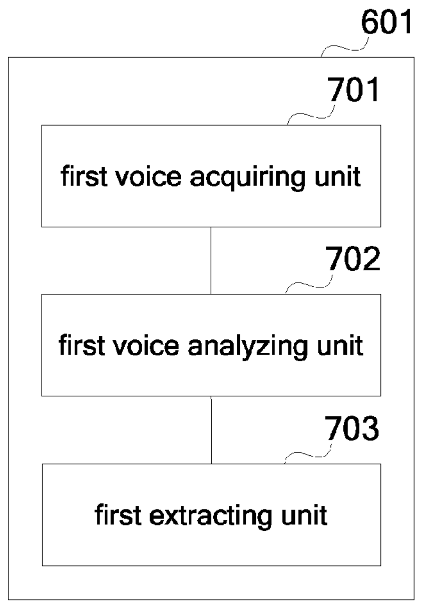
FIG. 7 is a schematic diagram of the structure of a first determining unit of Embodiment 2 of the present invention.

FIG. 7 is a schematic diagram of the structure of the first determining unit of Embodiment 2 of the present invention. As shown in FIG. 7, in Embodiment 2 of the present invention, the first determining unit 601 includes:

a first voice acquiring unit 701 configured to acquire voice signal of the subscriber to be analyzed;

a first voice analyzing unit 702 configured to spectrally analyze the voice signal of the subscriber to be analyzed, so as to obtain reference spectrum of the voice signal of the subscriber to be analyzed; and a first extracting unit 703 configured to extract the reference spectral characteristic from the reference spectrum.

Refer to particular operational modes of corresponding steps in Embodiment 1 for particular operational modes of the components of the first determining unit 601 in this embodiment, which shall not be described herein any further; furthermore, the first determining unit 601 may be provided with a storing unit and a selecting unit; wherein the storing unit pre-stores the subscriber to be analyzed and the reference spectral characteristic to which the subscriber corresponds, and the selecting unit determines corresponding reference spectral characteristic by selecting a subscriber to be analyzed.

Figure 8:
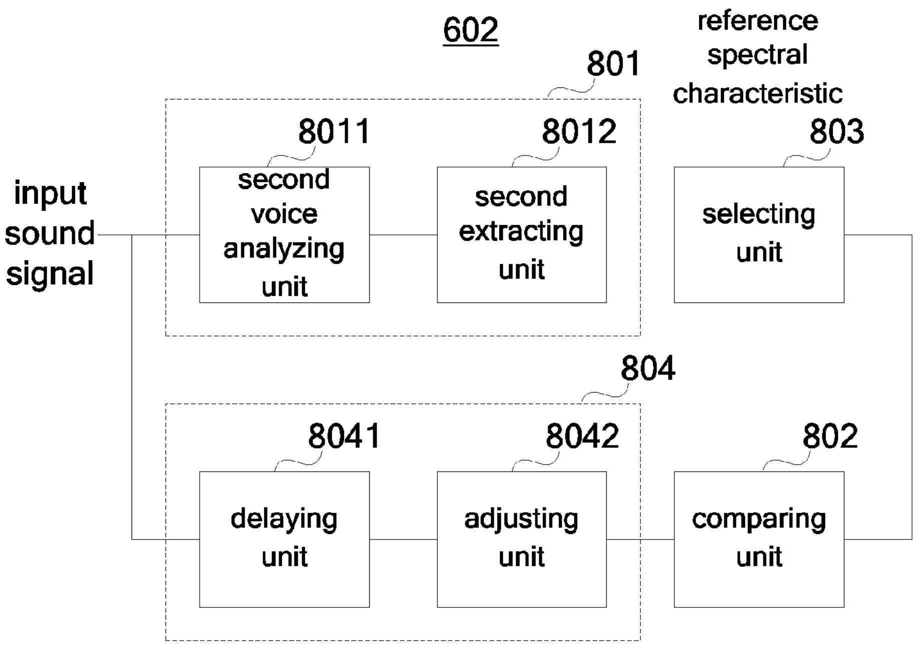
FIG. 8 is a schematic diagram of the structure of a filtering unit of Embodiment 2 of the present invention.

FIG. 8 is a schematic diagram of the structure of the filtering unit of Embodiment 2 of the present invention. As shown in FIG. 8, in Embodiment 2 of the present invention, the filtering unit 602 may include:

an input spectrum determining unit 801 configured to analyze the input sound signal, so as to determine an input spectral characteristic corresponding to the input sound signal;

a comparing unit 802 configured to compare the input spectral characteristic with the reference spectral characteristic;

a selecting unit 803 configured to select a gain corresponding to a result of the comparison; and a processing unit 804 configured to process the input sound signal according to the gain.

Refer to particular operational modes of corresponding steps in Embodiment 1 for particular operational modes of the components of the filtering unit 602 in this embodiment, which shall not be described herein any further.

In a particular mode of implementation, the input spectrum determining unit 801 may include:

a second voice analyzing unit 8011 configured to spectrally analyze input sound signal, so as to obtain input spectrum of the input sound signal; and a second extracting unit 8012 configured to extract input spectral characteristic from the input spectrum.

Refer to particular operational mode of step 501 in Embodiment 1 for particular operational modes of the components of the input spectrum determining unit 801 in this embodiment, which shall not be described herein any further.

Furthermore, in this embodiment, the processing unit 804 may include:

a delaying unit 8041 configured to delay the input sound signal; and an adjusting unit 8042 configured to adjust the intensity of the delayed input sound signal by using the gain.

Refer to particular operational mode of step 504 in Embodiment 1 for particular operational modes of the components of the processing unit 804 in this embodiment, which shall not be described herein any further.

It can be seen from the above embodiment that the voice filtering apparatus provided by Embodiment 2 of the present invention may enhance transmission effects of voices of different subscribers to be analyzed by using voice characteristics of the subscribers to be analyzed, so as to more efficiently transmit voice information.

Embodiment 3

An embodiment of the present invention provides electronic equipment, including the voice filtering apparatus as described in Embodiment 2.

Figure 9:
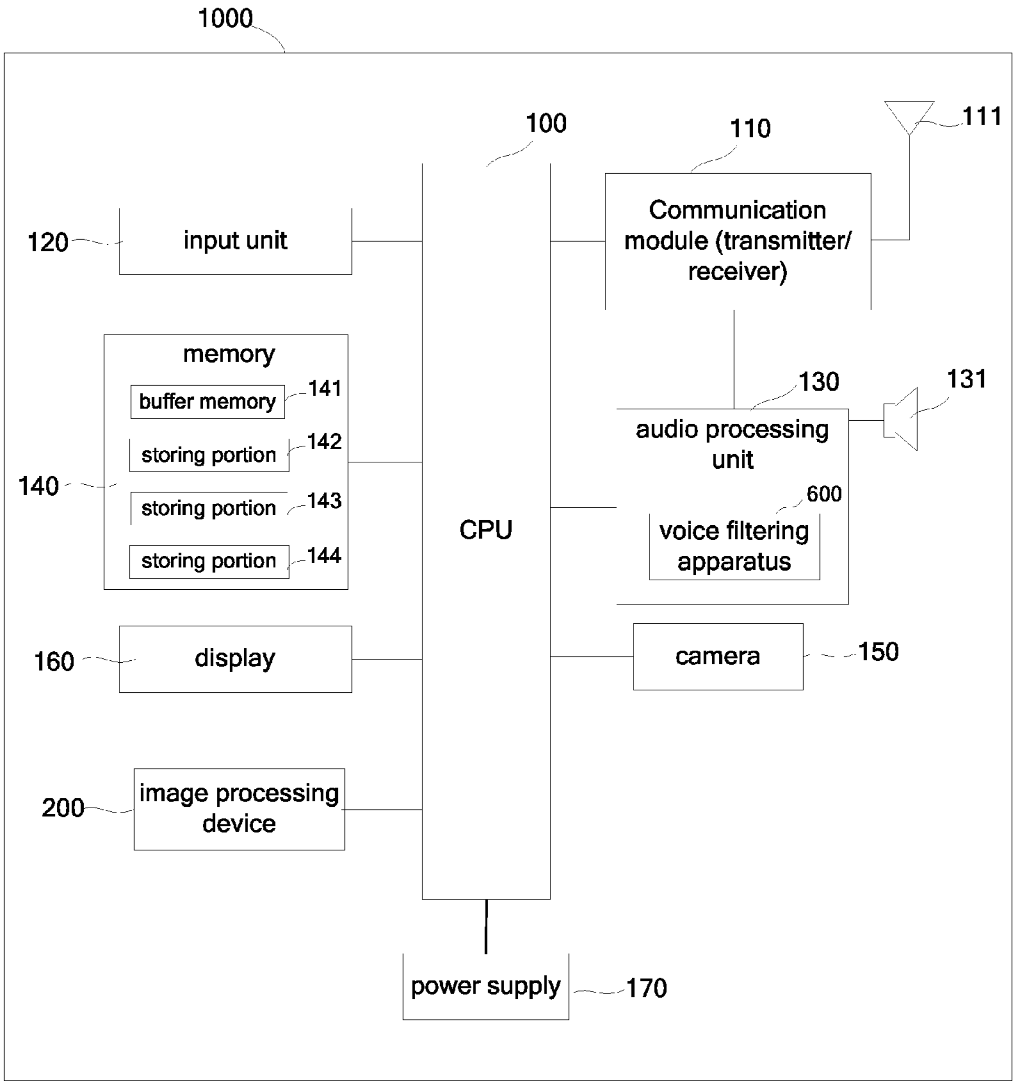
FIG. 9 is a block diagram of the system or composition of electronic equipment 1000 of an embodiment of the present invention.

FIG. 9 is a block diagram of the systematic composition of electronic equipment 1000 of an embodiment of the present invention, including an audio processor 130, the audio processor 130 including the voice filtering apparatus 600 of Embodiment 2 of the present invention. It should be noted that this diagram is illustrative only, and other types of structures may also be used for supplementing or replacing this structure, so as to implement the function of telecommunications or other functions.

As shown in FIG. 9, the electronic equipment 1000 may further include a CPU 100, a communication module 110, an input unit 120, an image processing device 200, a memory 140, a camera 150, a display 160, and a power supply 170.

The CPU 100 (also referred to as a controller or an operational control, which may include a microprocessor or other processing devices and/or logic devices) receives input and controls each part and operation of the electronic equipment 1000. The input unit 120 provides input to the CPU 100. The input unit 120 may be for example a key or touch input device. The camera 150 is used to take image data and provide the taken image data to the CPU 100 for use in a conventional manner, for example, for storage, and transmission, etc.

The power supply 170 is used to supply power to the electronic equipment 1000. And the display 160 is used to display the objects of display, such as images, and characters, etc. The display may be for example an LCD display, but it is not limited thereto.

The memory 140 is coupled to the CPU 100. The memory 140 may be a solid memory, such as a read-only memory (ROM), a random access memory (RAM), and a SIM card, etc., and may also be such a memory that stores information when the power is interrupted, may be optionally erased and provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the flow of the operation of the electronic equipment 1000 via the CPU 100.

The memory 140 may further include a data storing portion 143 used to store data, such as a contact person, digital data, pictures, voices and/or any other data used by the electronic equipment. A driver storing portion 144 of the memory 140 may include various types of drivers of the electronic equipment for the communication function and/or for executing other functions (such as application of message transmission, and application of directory, etc.) of the user equipment.

The communication module 110 is a transmitter/receiver 110 transmitting and receiving signals via an antenna 111. The communication module (transmitter/receiver) 110 is coupled to the CPU 100 to provide input signals and receive output signals, this being similar to the case in a conventional mobile phone.

A plurality of communication modules 110 may be provided in the same user equipment for various communication technologies, such a cellular network module, a Bluetooth module, and/or wireless local network module, etc. The communication module (transmitter/receiver) 110 is also coupled to a loudspeaker 131 and a microphone 132 via the audio processing unit 130, for providing audio output via the loudspeaker 131. Besides the voice filtering apparatus 600, the audio processing unit 130 may further include any suitable buffer, decoder, and amplifier, etc.

An embodiment of the present invention further provides a computer-readable program, wherein when the program is executed in electronic equipment, the program enables the computer to carry out the voice filtering method as described above in Embodiment 1 in the electronic equipment.

An embodiment of the present invention further provides a storage medium in which a computer-readable program is stored, wherein the computer-readable program enables the computer to carry out the voice filtering method as described above in Embodiment 1 in electronic equipment.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

I claim:

1. A voice filtering method, comprising:

determining a reference spectral characteristic to which a voice characteristic of a subscriber to be analyzed corresponds, said determining comprising acquiring a voice signal of the subscriber to be analyzed;

spectrally analyzing the voice signal of the subscriber to be analyzed, so as to obtain a reference spectrum of the voice signal of the subscriber to be analyzed; and extracting the reference spectral characteristic from the reference spectrum, the reference spectral characteristic comprising the number of order of a primary harmonic relative to a base frequency and an intensity of the primary harmonic; and filtering an input sound signal according to the reference spectral characteristic.

2. A voice filtering method, comprising:

determining a reference spectral characteristic to which a voice characteristic of a subscriber to be analyzed corresponds; and filtering an input sound signal according to the reference spectral characteristic, wherein the filtering an input sound signal according to the reference spectral characteristic comprises:

analyzing the input sound signal, so as to determine an input spectral characteristic corresponding to the input sound signal;

comparing the input spectral characteristic with the reference spectral characteristic;

selecting a gain corresponding to a result of the comparison; and processing the input sound signal according to the gain.

3. The voice filtering method according to claim 2, wherein the selecting a gain corresponding to the result of comparison comprises:

selecting a voice gain if the input spectral characteristic is identical to the reference spectral characteristic; and selecting a noise gain if the input spectral characteristic is different from the reference spectral characteristic.

4. The voice filtering method according to claim 2, wherein the processing the input sound signal according to the gain comprises:

delaying the input sound signal; and adjusting the intensity of the delayed input sound signal by using the gain.

5. A voice filtering apparatus, comprising:

a first determining unit configured to determine a reference spectral characteristic to which a voice characteristic of a subscriber to be analyzed corresponds, said first determining unit including a first voice acquiring unit configured to acquire a voice signal of the subscriber to be analyzed;

a first voice analyzing unit configured to spectrally analyze the voice signal of the subscriber to be analyzed, so as to obtain a reference spectrum of the voice signal of the subscriber to be analyzed; and a first extracting unit configured to extract the reference spectral characteristic from the reference spectrum, the reference spectral characteristic comprising the number of order of a primary harmonic relative to a base frequency and an intensity of the primary harmonic; and a filtering unit configured to filter an input sound signal according to the reference spectral characteristic.

6. The voice filtering apparatus according to claim 5, wherein the filtering unit comprises:

an input spectrum determining unit configured to analyze the input sound signal, so as to determine an input spectral characteristic corresponding to the input sound signal;

a comparing unit configured to compare the input spectral characteristic with the reference spectral characteristic;

a selecting unit configured to select a gain corresponding to a result of the comparison; and a processing unit configured to process the input voice signal according to the gain.

7. The voice filtering apparatus according to claim 6, wherein, a voice gain is selected by the selecting unit if the input spectral characteristic is identical to the reference spectral characteristic; and a noise gain is selected by the selecting unit if the input spectral characteristic is different from the reference spectral characteristic.

8. Electronic equipment, comprising the voice filtering apparatus as claimed in claim 7.

9. The voice filtering apparatus according to claim 6, wherein the processing unit comprises:

a delaying unit configured to delay the input sound signal; and an adjusting unit configured to adjust the intensity of the delayed input sound signal by using the gain.

10. Electronic equipment, comprising the voice filtering apparatus as claimed in claim 9.

11. Electronic equipment, comprising the voice filtering apparatus as claimed in claim 6.

12. Electronic equipment, comprising the voice filtering apparatus as claimed claim 5.

13. Electronic equipment, comprising the voice filtering apparatus as claimed in claim 5.

* * * * *